(12) United States Patent
Awazu et al.

(10) Patent No.: US 7,923,878 B2
(45) Date of Patent: Apr. 12, 2011

(54) AXIAL GAP CORELESS MOTOR AND POSITIONING UNIT

(75) Inventors: Minoru Awazu, Yokohama (JP); Katsuya Seko, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 319 days.

(21) Appl. No.: 11/871,413

(22) Filed: Oct. 12, 2007

(65) Prior Publication Data

US 2008/0100157 A1 May 1, 2008

(30) Foreign Application Priority Data

Oct. 31, 2006 (JP) ................................. 2006-296005

(51) Int. Cl.
- *H02K 21/12* (2006.01)
- *H02K 37/00* (2006.01)
- *H02K 21/00* (2006.01)
- *H02K 1/06* (2006.01)
- *H02K 1/22* (2006.01)

(52) U.S. Cl. ............. 310/156.32; 310/49.05; 310/49.07; 310/156.34; 310/156.36; 310/198; 310/216.061; 310/268

(58) Field of Classification Search ............. 310/156.32, 310/156.34–156.37, 216.061, 49.05–49.07, 310/49.22, 198, 268
See application file for complete search history.

(56) References Cited

U.S. PATENT DOCUMENTS

| | | | | | |
|---|---|---|---|---|---|
| 4,240,733 | A | * | 12/1980 | Ueda et al. | 396/406 |
| 4,429,240 | A | * | 1/1984 | Kishi | 310/45 |

FOREIGN PATENT DOCUMENTS

| | | | | |
|---|---|---|---|---|
| JP | 58182465 | A | * | 10/1983 |
| JP | 62236351 | A | * | 10/1987 |
| JP | 03226254 | A | * | 10/1991 |
| JP | 05-227717 | | | 9/1993 |
| JP | 09215231 | A | * | 8/1997 |
| JP | 2002369477 | A | * | 12/2002 |

OTHER PUBLICATIONS

Machine Translation JP 09215231 A (1997) and Derwent Translation JP 62236351 A (1987).*
Derwent Translation Purpose and Constitution JP58182465 (1983) and JP03226254 (1991) and Machine Tranlation JP2002369477 (2002).*

* cited by examiner

*Primary Examiner* — Quyen Leung
*Assistant Examiner* — Jose A Gonzalez Quinones
(74) *Attorney, Agent, or Firm* — Pearne & Gordon LLP

(57) ABSTRACT

An axial gap coreless motor includes a stator including a stator yoke having a surface and being composed of a plurality of laminated layers of silicon steel sheets secured together, a wiring substrate having a surface and being disposed on the stator yoke surface, and a plurality of coreless coils annularly disposed on the wiring substrate surface; and a rotor including a rotor magnet having a plurality of circumferentially arranged magnetic poles, wherein the rotor is rotated relative to the stator such that the rotor magnet axially confronts the coreless coil over an air gap.

6 Claims, 9 Drawing Sheets

TORQUE CHARACTERISTICS CALCULATION RESULT FOR RADIALLY DIFFERENT CAULK POSITIONS

AXIAL GAP CORELESS MOTOR AND POSITIONING UNIT

This application is based upon and claims the benefit of priority from the prior Japanese Patent Application 2006-296005, filed on, Oct. 31, 2006 the entire contents of which are incorporated herein by reference.

FIELD

The present disclosure is directed to an axial gap coreless motor and a positioning unit using the same.

BACKGROUND

A conventional stator yoke for an axial gap coreless motor is made of a magnetic material such as a single sheet of silicon steel sheet or thin sheet of silicon iron as disclosed, for example, in JP H05-227717 A.

When strong magnets such as a sintered neodymium magnet are employed as a rotor magnet in a motor configured by a stator yoke made of a single sheet of silicon steel, the magnetic attraction of the rotor magnet may cause stator vibration and noise resulting in degradation in motor stop precision. The magnetic attraction may also cause magnetic flux saturation inside the stator yoke leading to invalid torque.

SUMMARY

The present disclosure provides an axial gap coreless motor that suppresses vibration, noise and magnetic flux saturation during rotor rotation even when strong magnets are employed as a rotor magnet.

The axial gap coreless motor of the present disclosure includes a stator including a stator yoke having a surface and being composed of a plurality of laminated layers of silicon steel sheets secured together, a wiring substrate having a surface and being disposed on the stator yoke surface, and a plurality of coreless coils annularly disposed on the wiring substrate surface; and a rotor including a rotor magnet having a plurality of circumferentially arranged magnetic poles, wherein the rotor is rotated relative to the stator such that the rotor magnet axially confronts the coreless coil over an air gap.

According to the above described axial gap coreless motor, rigidity of the stator yoke is increased by configuring the stator yoke by a plurality of secured laminated layers of silicon steel sheets and occurrence of stator vibration and noise can be prevented during rotor rotation even when strong magnets are used as the rotor magnet. Also, increase in the thickness of the silicon sheets allows prevention of magnetic flux saturation inside the stator yoke.

BRIEF DESCRIPTION OF THE DRAWINGS

Other objects, features and advantages of the present disclosure will become clear upon reviewing the following description of the embodiments with reference to the accompanying drawings, in which.

DETAILED DESCRIPTION

A first embodiment of the present disclosure will be described hereinafter with reference to FIGS. 1 to 5.

Figure 1:
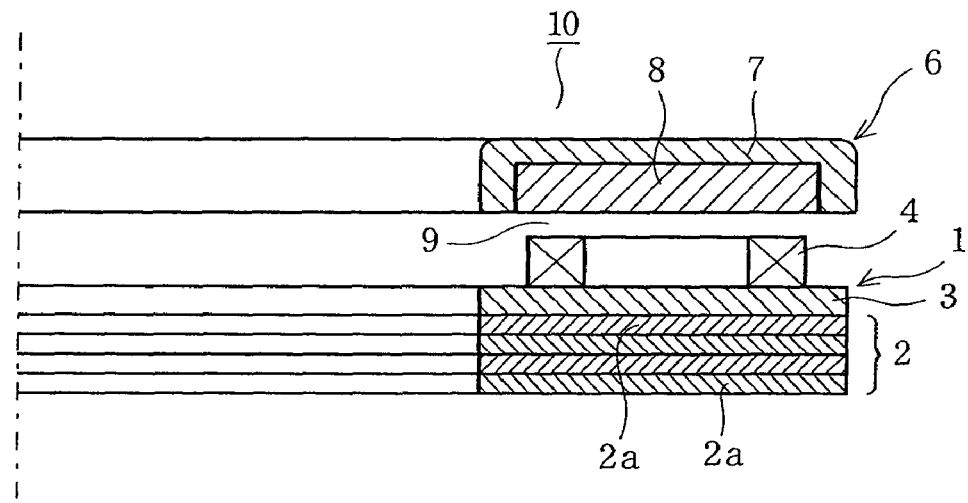
FIG. 1 is a vertical cross sectional view of an axial gap coreless motor indicating a first embodiment of the present disclosure.
Figure 2:
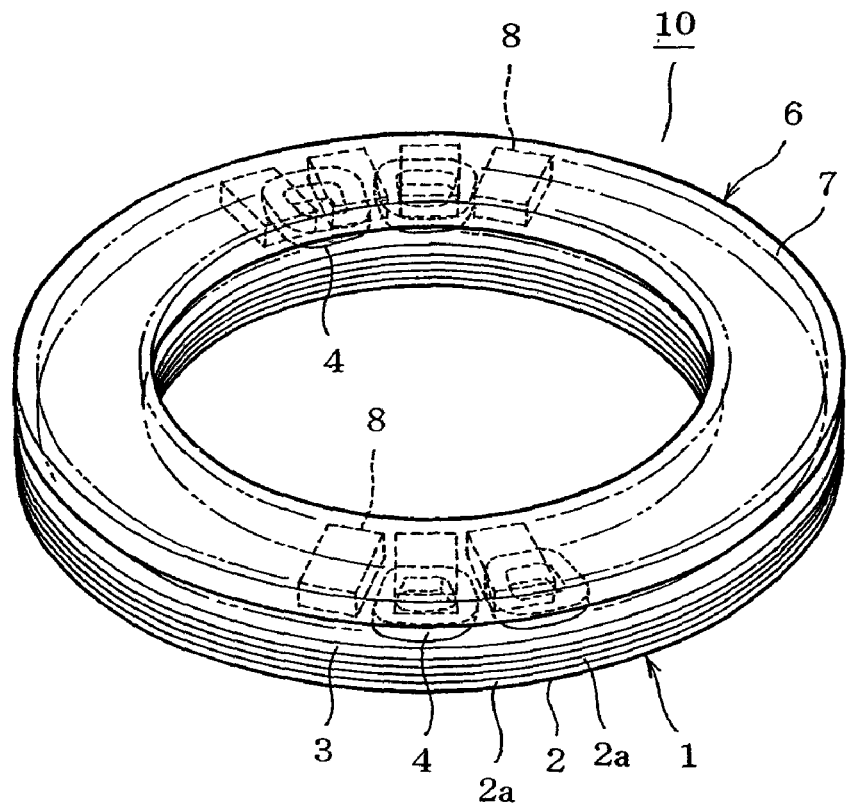
FIG. 2 is a perspective overview of the motor.

Referring to FIGS. 1 and 2, a stator 1 includes an annular stator yoke 2 (refer to FIG. 3) having a plurality of surfaces, a wiring substrate 3 composed of a printed wire substrate having a plurality of surfaces secured on the upper surface which is one of the surfaces of the stator yoke 2, and a plurality of coreless coils 4 secured respectively on the upper surface which is one of the surfaces of the wiring substrate 3. There are eighteen coreless coils 4 disposed annularly at consistent spacing in the circumferential direction. Each coreless coil 4 is electrically connected to a wiring pattern not shown provided on the wiring substrate 3.

The stator yoke 2 has a plurality of silicon steel sheets 2a, four in this case, arranged in laminated layers secured by caulking. The caulked portion is identified as caulk 5 in FIG. 3. In this case, caulks 5 are disposed only at the inner- and outer-diameter edges of the stator yoke 2 respectively at consistent spacing (equal distribution) in the circumferential direction. Twelve caulks 5 are disposed respectively in the inner-diameter side and the outer-diameter side.

The rotor 6 includes an annular rotor yoke 7 and a plurality of rotor magnets 8 secured on the underside of the rotor yoke 7 as viewed in FIGS. 1 and 2. The rotor 6 is disposed rotatably relative to the stator 1 such that the undersides of the rotor magnets 8 axially confront the coreless coils 4 over the air gaps 9 (refer to FIG. 1).

The rotor yoke 7 is made of a magnetic material. A total of 2n pieces (n is a positive integer equal to or greater than 1), in this case twenty four pieces, of rotor magnets 8 are disposed annularly at consistent spacing in the circumferential direction. Each rotor magnet 8 is in a substantially rectangular plate form and the magnetic pole of the surface confronting the coreless coil 4 is arranged so as to be of an opposite pole of that of the adjacent rotor magnet 8. A sintered neodymium magnet having strong magnetic force is employed as rotor magnet 8 in this case. Each rotor magnet 8 may be configured in an arc so that its outer and inner peripheral portions in top view are in alignment with the arc of the inner and outer peripheral portions of the annular rotor yoke 7.

Figure 3:
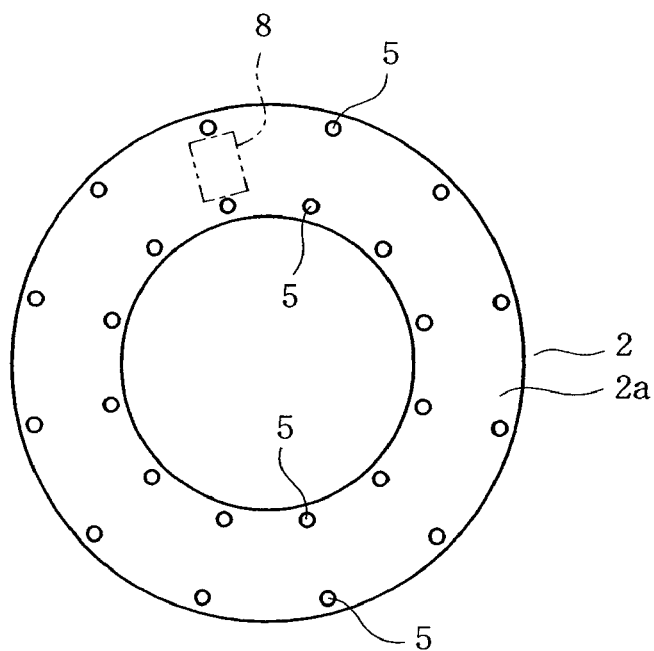
FIG. 3 is a plan view of a stator yoke.

Each rotor magnet 8 is positioned relative to the stator yoke 2 so as to be disposed between the inner-diameter caulk 5 and the outer-diameter caulk 5 as indicated in double-dot chain line in FIG. 3. Thus, there will be very little confrontation, if any, between each rotor magnet 8 and each of the inner- and outer-diameter caulk 5 during rotation of the rotor 6. Stated differently, each caulk 5 of the stator yoke 2 is disposed so as to be radially displaced from the position confronting the rotor magnet 8. That is, each of the caulks 5 is disposed in the proximity of the radial edge of the stator yoke 2. The axial gap coreless motor 10 (referred to as a motor as required hereinafter) is configured as described above.

Figure 4:
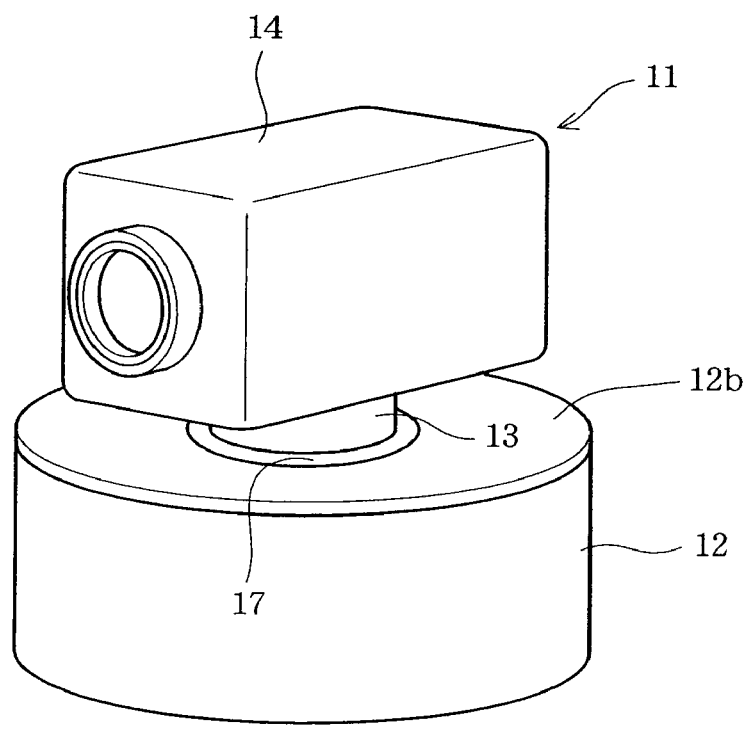
FIG. 4 is an external perspective view of a positioning unit.
Figure 5:
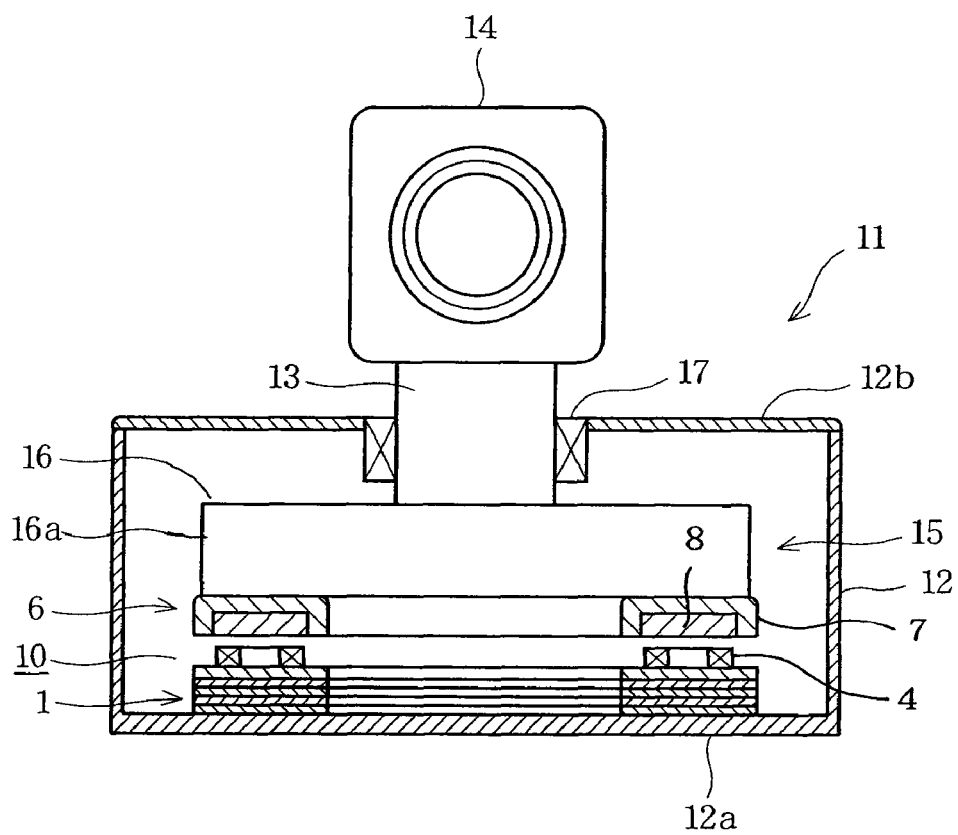
FIG. 5 is a vertical cross sectional view of the positioning unit.

FIGS. 4 and 5 illustrate a positioning unit 11 of a camera. A rotary mechanism 15 employing the above described motor 10 as a drive source is disposed inside the body 12 of the positioning unit 11. The stator 1 of the motor 10 is secured on a base 12a inside the body 12. A rotary element 16 is provided on the upper portion of the rotor 6. The rotary element 16 includes a disc-shaped connecting element 16a and a rotary shaft 13 protruding from the upper surface of the connecting element 16a. The connecting element 16a is connected to the upper portion of the rotor 6 so as to be rotated integrally with the rotor 6. The rotary shaft 13 rotating integrally with the connecting element 16a is supported rotatably by a bearing 17 provided on an upper wall 12b of the body 12. The rotary shaft 13 upwardly protruding through the bearing 17 has a camera 14 connected on the upper end thereof, the camera 14 being the object of control. As can be seen from the above description, the camera 14 is rotated integrally with the rotor 6 via the rotary element 16.

The positioning unit 11 controls the rotational position of the camera 14 by controlling the rotation rotor 6 of the motor 10.

The above described embodiment provides the following operation and effects.

Firstly, since the axial gap coreless motor 10 has a stator yoke 2 configured by a plurality of layers, four in this case, of secured silicon steel sheets 2a, increased stator yoke 2 rigidity is obtained and occurrence of stator 1 vibration and noise can be prevented during rotor 6 rotation even when magnets having strong magnetic force is used for the rotor magnet 8. Also, since the thickness of the silicon steel sheets 2a are consequently increased, magnetic flux saturation inside the stator yoke 2 can be prevented.

Since the stator yoke 2 is configured by a plurality of laminated layers of silicon steel sheets 2a secured by caulking, the stator yoke 2 can be manufactured with ease, consequently preventing cost increase.

Since the stator yoke 2 has the caulks 5 disposed so as to be radially displaced from the position confronting the rotor magnets 8, there is very little possibility, if any, of the rotor magnets 8 being in confrontation with the caulks 5, thereby suppressing magnetic ripple caused by the caulks 5 and providing increased prevention of motor 10 vibrations.

Employing such motor 10 (with suppressed stator 1 vibration during rotor 6 rotation) as a drive source in a rotary mechanism 15 that controls camera 14 positioning allows improvement in stop precision of the camera 14; and more generally, a high-precision positioning control of the camera 14.

Figure 6:
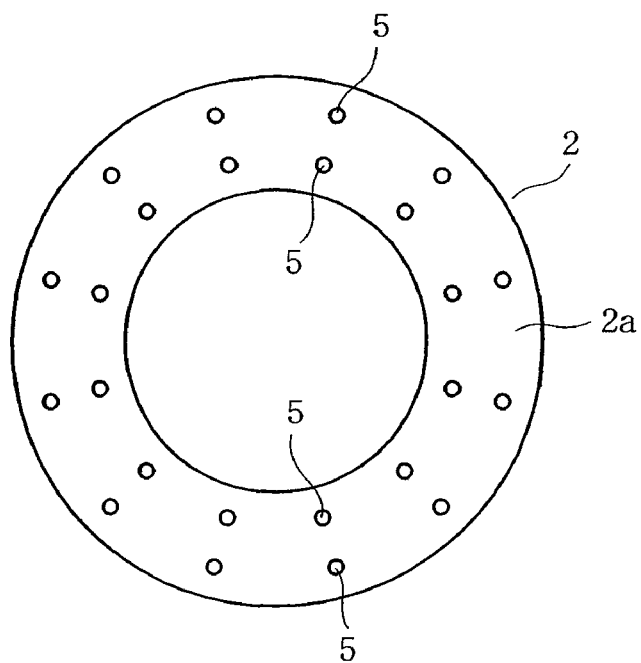
FIG. 6 corresponds to FIG. 3 and indicates a second embodiment the present disclosure.

FIG. 6 illustrates a second embodiment of the present disclosure. The second embodiment differs from the first embodiment in that, each of the inner- and outer-diameter caulk 5 of the stator yoke 2 is radially centered compared to the first embodiment. The number of caulks 5 in the circumferential direction is twelve respectively as in the first embodiment, and the caulks 5 are disposed at consistent spacing (equal distribution) in the circumferential direction.

Figure 7:
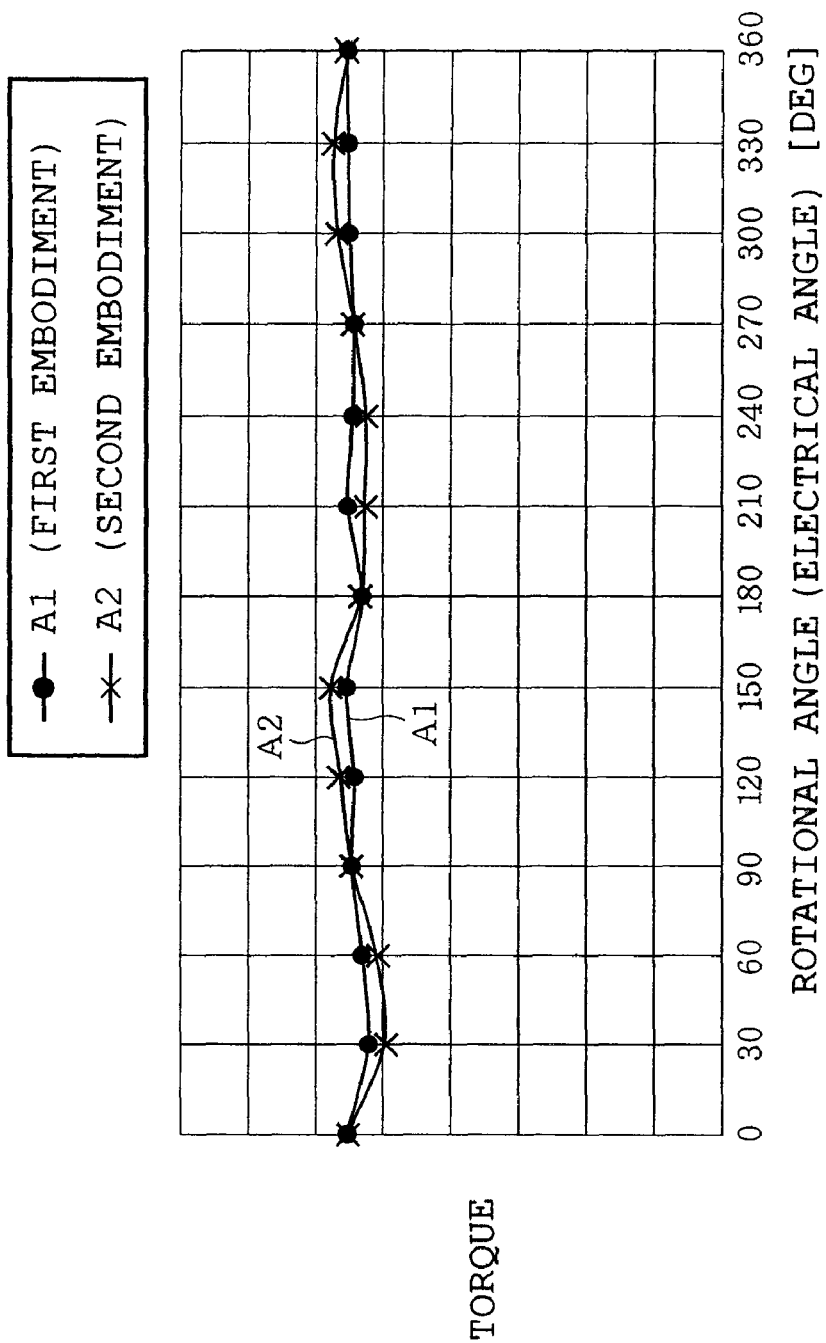
FIG. 7 is a chart indicating a calculated result of torque characteristics when caulking is applied in different positions (caulking applied in different radial positions)

FIG. 7 indicates the result of calculation provided by analysis software on the impact of difference in radial positioning of caulk 5 on torque ripple. The characteristic line A1 depicts the disposition of the first embodiment (caulks 5 disposed only at the radial edges) and the characteristic line A2 depicts the disposition of the second embodiment (caulks 5 radially centered).

The following can be observed from FIG. 7. When the caulks 5 are disposed at the radial edges (in the case of characteristic line A1), the rotor magnet 8 passes by without confronting the caulk 5 during rotor rotation 6; thereby mitigating magnetic ripple caused by the caulk 5 and reducing torque ripple. As opposed to this, when the caulks 5 are radially centered (in the case of characteristic line A2), the rotor magnet 8 passes over the caulk 5 during rotor rotation 6 so as to be in confrontation therewith. Thus, torque ripple is increased under the influence of magnetic ripple originating from the caulk 5. It can be understood from the above that the first embodiment is advantageous in terms of mitigating torque ripple.

Figure 8:
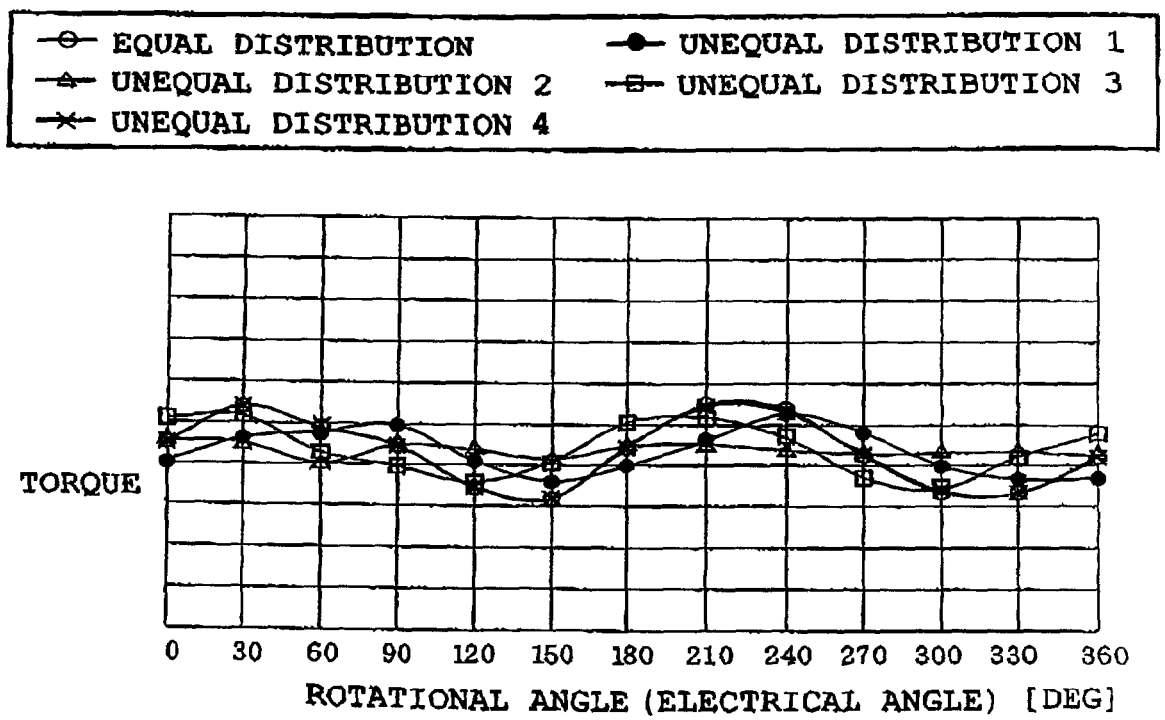
FIG. 8 is a chart indicating a calculated result of torque characteristics when caulking is applied in different positions (caulking applied in different circumferential positions) in a third to seventh embodiment of the present disclosure.

FIGS. 8 and 9 (9A to 9E) illustrate a third to seventh embodiment of the present disclosure. FIG. 8 indicates the result of calculation provided by analysis software on the impact of difference in circumferential positioning of caulk 5 on torque ripple. FIGS. 9A to 9E illustrate the corresponding position of the caulks 5 of the stator yoke 2. The motor, on which the calculation is based, is a motor having rotor magnet 8 with twenty four magnetic poles as in the first embodiment. Each stator yoke 2 has twelve circumferential rows of caulks 5 with each row including three pieces of radially aligned caulks 5.

Figure 9A:
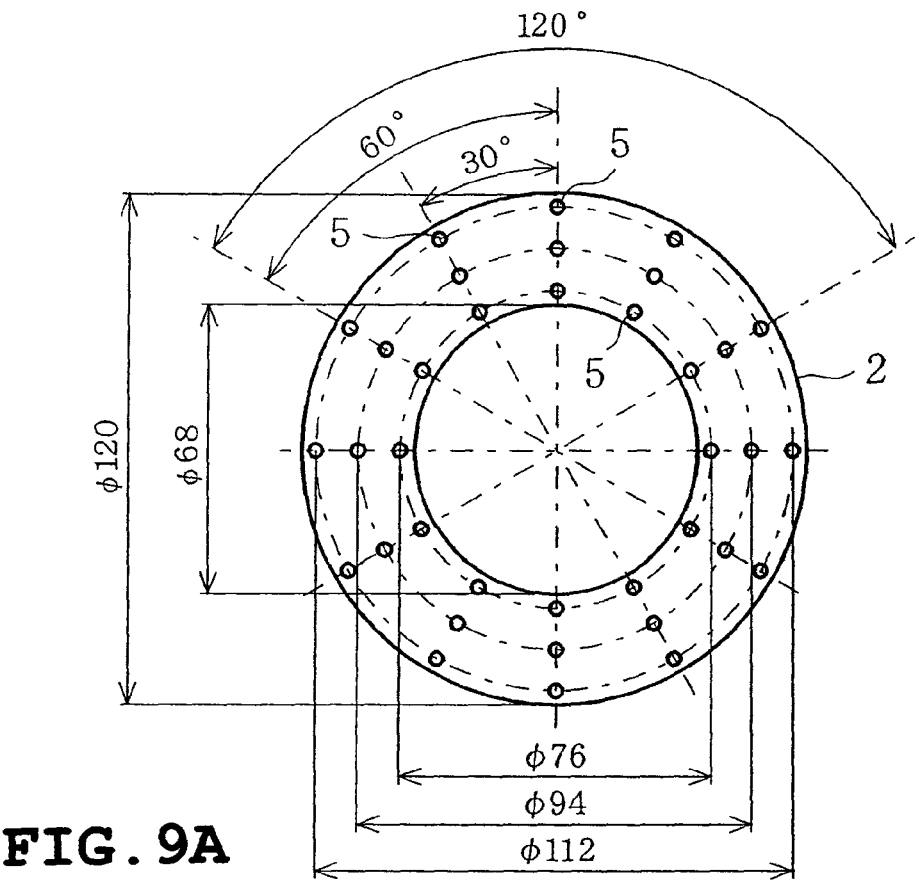
FIGS. 9 (A) to (E) are plan views of the stator yoke indicating the third to the seventh embodiment of the present disclosure.
Figure 9B:
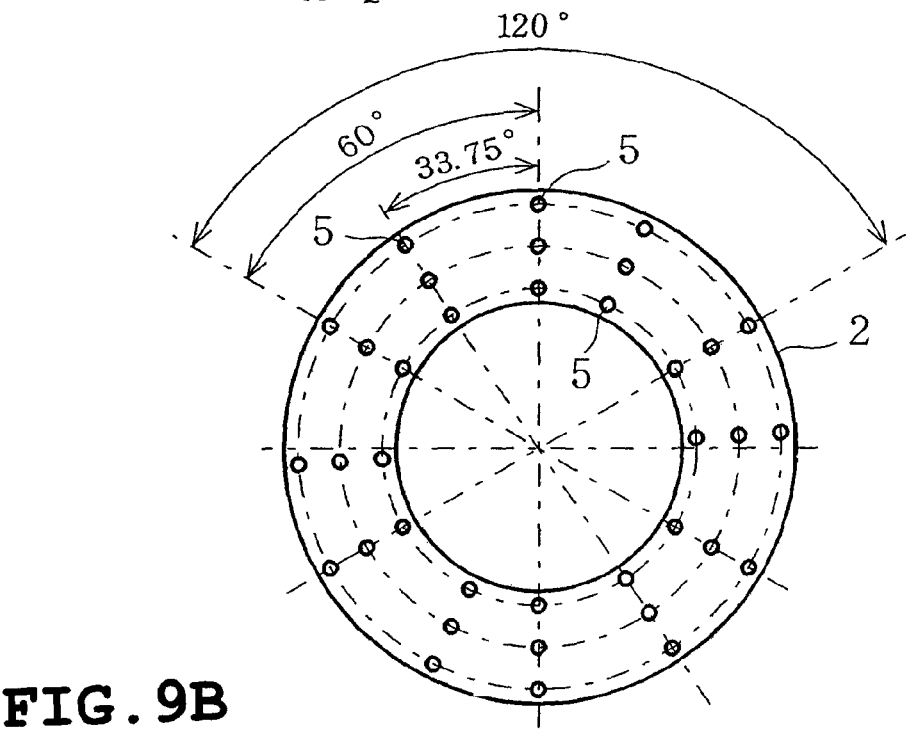
Figure 9C:
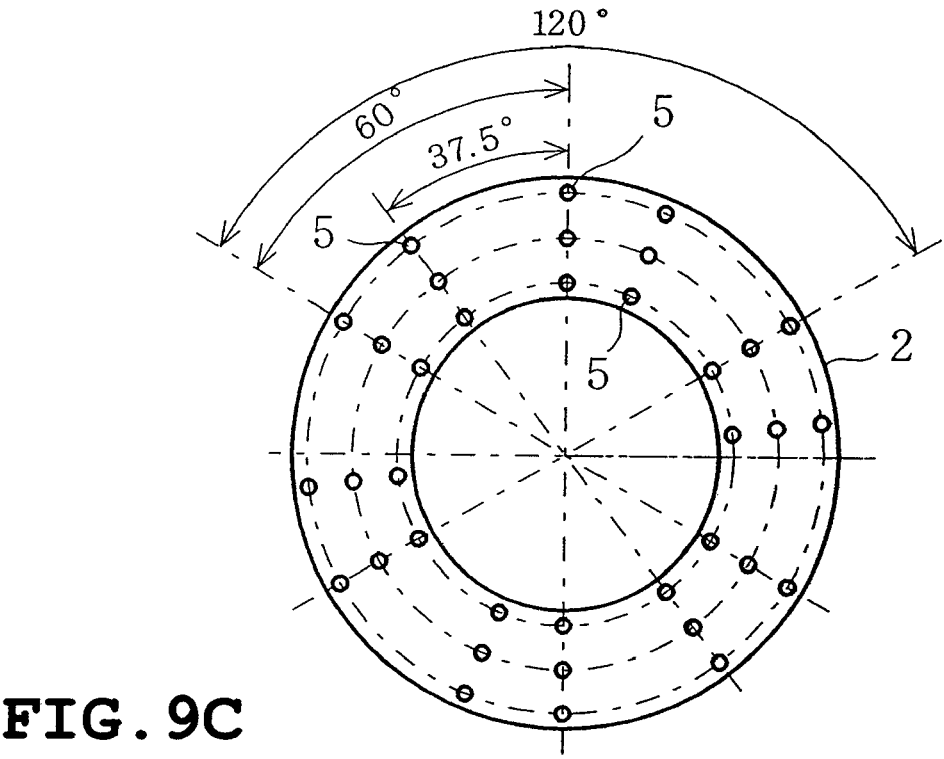
Figure 9D:
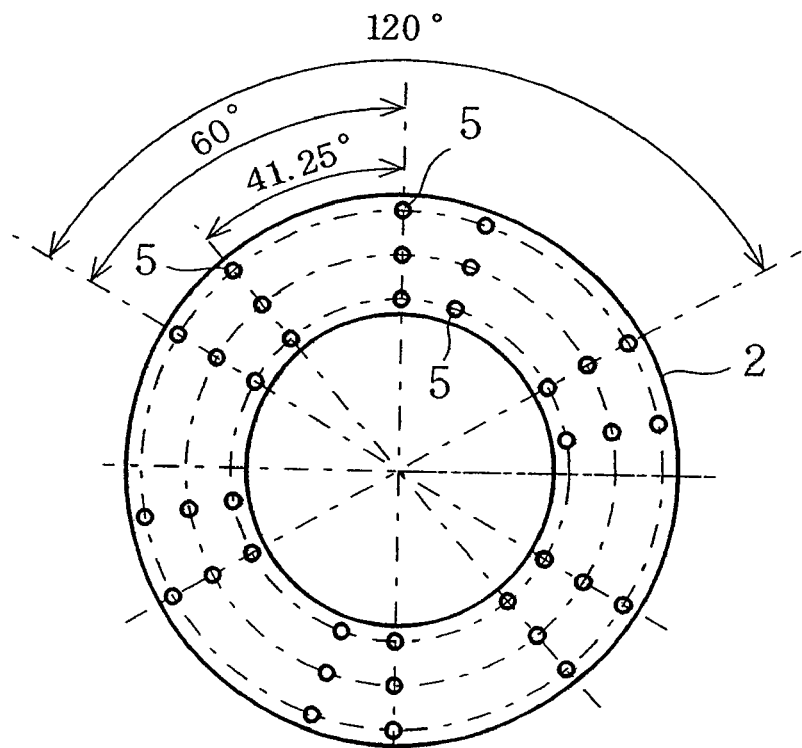

FIG. 9A illustrates the caulks 5 being disposed at consistent spacing (equal distribution) of 30 degrees in the circumferential direction (equal distribution, third embodiment). FIG. 9B illustrates the caulks 5 within 60 degrees of circumference being disposed in a position 33.75 degrees from one side and 26.25 degrees from the other side (unequal distribution 1, fourth embodiment). FIG. 9C illustrates the caulks 5 within 60 degrees of circumference being disposed in a position 37.5 degrees from one side and 22.5 degrees from the other side (unequal distribution 2, fifth embodiment). FIG. 9D illustrates the caulks 5 within 60 degrees of circumference being disposed in a position 41.25 degrees from one side and 18.75 degrees from the other side (unequal distribution 3, sixth embodiment). Finally, FIG. 9E illustrates the caulks 5 within 60 degrees of circumference being disposed in a position 45 degrees from one side and 15 degrees from the other side (unequal distribution 4, seventh embodiment).

Figure 9E:
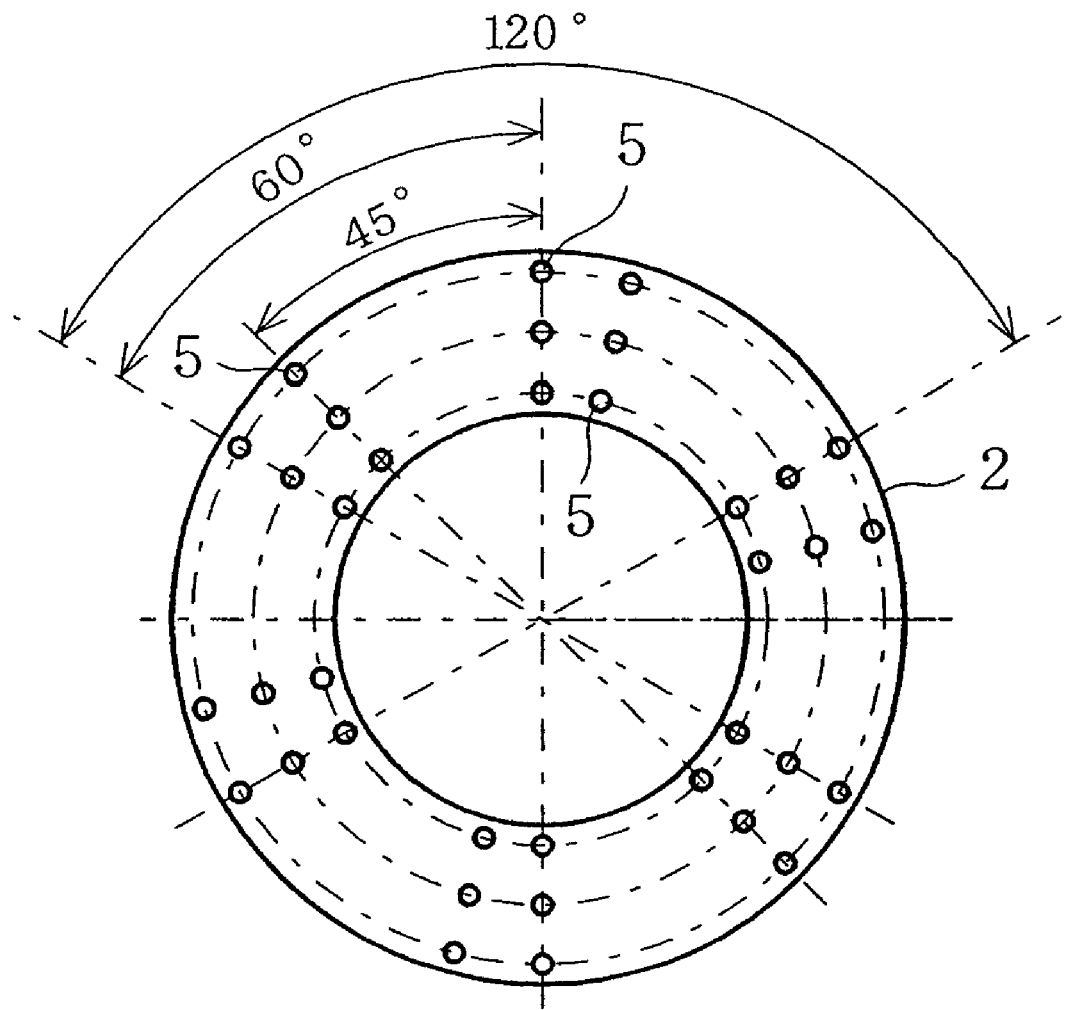

In the configurations illustrated in FIG. 9A (equal distribution) and FIG. 9E (unequal distribution 4), the caulks 5 in all twelve rows confront the underside of the rotor magnet 8 simultaneously during rotor 6 rotation, whereas in the configuration illustrated in FIG. 9C (unequal distribution 2), only six rows of caulks 5 confront the underside of the rotor magnets 8 simultaneously and the rest of the six rows of caulks 5 confront the substantial central portion of the intervening area between the neighboring rotor magnets 8. In the configurations illustrated in FIG. 9B (unequal distribution 1) and FIG. 9D (unequal distribution 3), only six rows of caulks 5 confront the underside of the rotor magnet 8 simultaneously, however, the remaining six rows of caulks 5 are also in confrontation with a portion relatively close to the rotor magnet 8.

It can be observed from FIG. 8 that the greater the number (number of rows) of caulks 5 confronting the underside of the rotor magnets 8 simultaneously during rotor 6 rotation, the greater the magnitude of torque ripple. In other words, less number (number of rows) of caulk 5 confronting the underside of the rotor magnets 8 simultaneously during rotor 6 rotation results in smaller magnitude of torque ripple.

Figure 10:
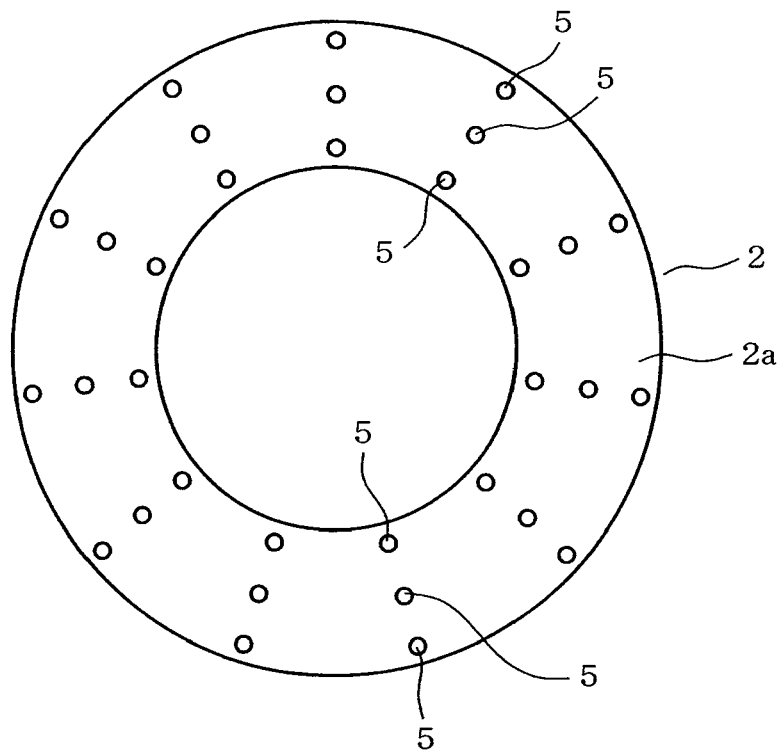
FIG. 10 is a plan view of the stator yoke indicating the eighth embodiment of the present disclosure.

FIG. 10 illustrates an eighth embodiment of the present disclosure characterized in that the stator yoke 2 has three radially aligned caulks 5 disposed circumferentially in eleven equally spaced rows (eleven equal distribution). In the present embodiment, the motor having twenty four magnetic poles (the number of magnetic poles of the rotor magnet 8 being twenty four) does not have a common denominator other than 1 between its number of magnetic poles (twenty four) and the number of caulks 5 in the circumferential direction (eleven). Thus, the timing in which the rotor magnet 8 passes over the caulking 5 can be dispersed, thereby reducing torque ripple and mitigating stator yoke 2 vibration in greater magnitude.

Figure 11:
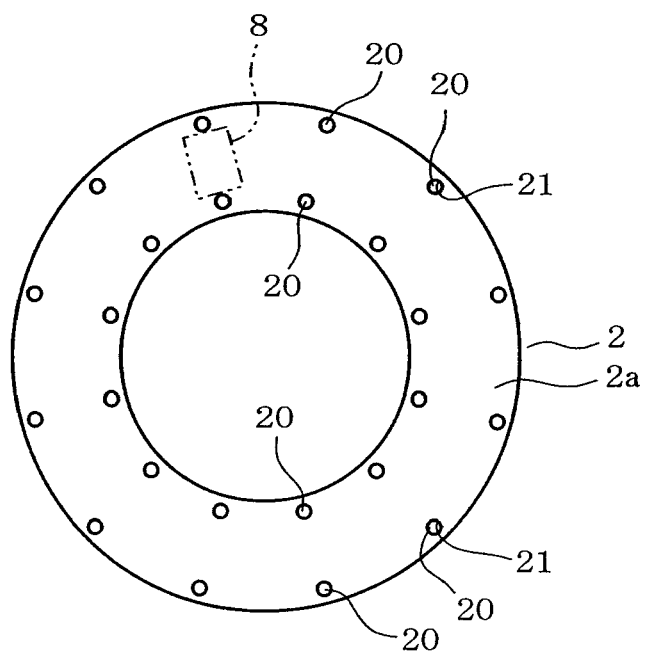
FIG. 11 is a plan view of the stator yoke indicating the ninth embodiment of the present disclosure.

FIG. 11 illustrates a ninth embodiment which differs from the first embodiment in that connecting elements 20 such as pins and rivets are used for securing the plurality (four for example) of laminated layers of silicon steel sheets 2a constituting the stator yoke 2 instead of caulking. More specifically, a hole 21 is defined through each silicon steel sheet 2a constituting the stator yoke 2 in the direction of thickness of the sheets at the position corresponding to the caulk 5 in the first embodiment. The plurality of laminated silicon sheets 2a are secured by inserting the connecting element 20 in each hole 21.

In such case, it is preferable for the connecting element 20 to be made of the same material as the silicon steel sheet 2a; however, when using different materials, magnetic materials may be used instead. Under such case, magnetic effects of the connecting element 20 can be minimized.

The present disclosure is not limited to the above described embodiments but may be modified or expanded as follows. The plurality of silicon sheets 2a constituting the stator yoke 2 may be laminated and secured by an adhesive instead of caulking. Such configuration prevents occurrence of magnetic ripples originating from the caulks 5, consequently mitigating stator yoke 2 vibration more effectively.

The number of laminated layers of silicon sheets 2a constituting the stator yoke 2 is not limited to four, but may be any number if two or greater. The rotor magnet may be configured by a single annular piece having 2n number of magnetic poles magnetized to it.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. An axial gap coreless motor, comprising:
   a stator including a stator yoke having a surface and being composed of a plurality of laminated layers of silicon steel sheets secured together, a wiring substrate having a surface and being disposed on the stator yoke surface, and a plurality of coreless coils annularly disposed on the wiring substrate surface; and
   a rotor including a rotor magnet having a plurality of circumferentially arranged magnetic poles, wherein the rotor is rotated relative to the stator such that the rotor magnet axially confronts the coreless coil over an air gap,
wherein the plurality of laminated silicon sheets are secured by together by a caulking disposed in an equal circumferential distribution, and
wherein a number of the circumferentially disposed caulking and a number of the magnetic poles of the rotor magnet do not have a common denominator other than 1.

2. A positioning unit including a rotary mechanism driven by an axial gap coreless motor provided therewith, the axial gap coreless motor, comprising:
   a stator including a stator yoke having a surface and being composed of a plurality of laminated layers of planar silicon steel sheets, a wiring substrate having a surface and being disposed on the stator yoke surface, and a plurality of coreless coils annularly disposed on the wiring substrate surface; and
   a rotor including a rotor magnet having a plurality of circumferentially arranged magnetic poles, wherein the rotor is rotated relative to the stator such that the rotor magnet axially confronts the coreless coil over an air gap
wherein the plurality of laminated silicon sheets are secured together by a caulking disposed in an equal circumferential distribution, and
wherein a number of the circumferentially disposed caulking and a number of the magnetic poles of the rotor magnet do not have a common denominator other than 1.

3. An axial gap coreless motor, comprising:
   a stator including a stator yoke having a surface and being composed of a plurality of laminated layers of planar silicon steel sheets, a wiring substrate having a surface and being disposed on the stator yoke surface, and a plurality of coreless coils annularly disposed on the wiring substrate surface; and
   a rotor including a rotor magnet having a plurality of circumferentially arranged magnetic poles, wherein the rotor is rotated relative to the stator such that the rotor magnet axially confronts the coreless coil over an air gap,
wherein the plurality of laminated silicon sheets are secured together by a caulking, and
   wherein the caulking is radially displaced from the rotor magnets so as not to confront the rotor magnets.

4. An axial gap coreless motor, comprising:
   a stator including a stator yoke having a surface and being composed of a plurality of laminated layers of planar silicon steel sheets, a wiring substrate having a surface and being disposed on the stator yoke surface, and a plurality of coreless coils annularly disposed on the wiring substrate surface;
   a rotor including a rotor magnet having a plurality of circumferentially arranged magnetic poles, wherein the rotor is rotated relative to the stator such that the rotor magnet axially confronts the coreless coil over an air gap; and
   a mechanical connecting element for securing the plurality of laminated silicon sheets together,
wherein the mechanical connecting element comprises a magnetic material when securing the plurality of laminated silicon steel sheets by the mechanical connecting element made of a material other than the silicon steel sheet, and
   wherein each laminated silicon steel sheet is disposed so as to contact at least another laminated silicon steel sheet.

5. A positioning unit including a rotary mechanism driven by an axial gap coreless motor provided therewith, the axial gap coreless motor comprising:
   a stator including a stator yoke having a surface and being composed of a plurality of laminated layers of planar silicon steel sheets, a wiring substrate having a surface and being disposed on the stator yoke surface, and a plurality of coreless coils annularly disposed on the wiring substrate surface; and
   a rotor including a rotor magnet having a plurality of circumferentially arranged magnetic poles, wherein the rotor is rotated relative to the stator such that the rotor magnet axially confronts the coreless coil over an air gap,
wherein the plurality of laminated silicon sheets are secured together by a caulking, and
wherein the caulking is radially displaced from the rotor magnets so as not to confront the rotor magnets.

6. A positioning unit including a rotary mechanism driven by an axial gap coreless motor provided therewith, the axial gap coreless motor comprising:

a stator including a stator yoke having a surface and being composed of a plurality of laminated layers of planar silicon steel sheets, a wiring substrate having a surface and being disposed on the stator yoke surface, and a plurality of coreless coils annularly disposed on the wiring substrate surface; and a rotor including a rotor magnet having a plurality of circumferentially arranged magnetic poles, wherein the rotor is rotated relative to the stator such that the rotor magnet axially confronts the coreless coil over an air gap; and a mechanical connecting element for securing the plurality of laminated silicon sheets together, wherein the mechanical connecting element comprises a magnetic material when securing the plurality of laminated silicon steel sheets by the mechanical connecting element made of a material other than the silicon steel sheet, and wherein each laminated silicon steel sheet is disposed so as to contact at least another laminated silicon steel sheet.

* * * * *